(12) United States Patent
Chen et al.

(10) Patent No.: US 10,359,968 B1
(45) Date of Patent: Jul. 23, 2019

(54) SMART DATA MOVEMENT AMONG VIRTUAL STORAGE DOMAINS

(71) Applicant: EMC IP Holding Company LLC, Hopkinton, MA (US)

(72) Inventors: Xiangping Chen, Sherborn, MA (US); Anton Kucherov, Milford, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 15/885,027

(22) Filed: Jan. 31, 2018

(51) Int. Cl.
*G06F 3/00* (2006.01)
*G06F 3/06* (2006.01)
*H04L 9/06* (2006.01)
*H04L 29/08* (2006.01)
*G06F 9/455* (2018.01)

(52) U.S. Cl.
CPC .......... *G06F 3/0647* (2013.01); *G06F 3/0604* (2013.01); *G06F 3/0608* (2013.01); *G06F 3/0665* (2013.01); *G06F 9/45558* (2013.01); *H04L 9/0643* (2013.01); *H04L 67/1097* (2013.01); *G06F 2009/45583* (2013.01)

(58) Field of Classification Search
CPC .... G06F 3/0647; G06F 3/0608; G06F 3/0604; G06F 3/0665; G06F 9/45558; G06F 2009/45583; H04L 9/0643; H04L 67/1097
See application file for complete search history.

(56) References Cited

U.S. PATENT DOCUMENTS

| 7,475,124 | B2 | 1/2009 | Jiang et al. |
| 8,327,103 | B1 | 12/2012 | Can et al. |
| 8,380,928 | B1 | 2/2013 | Chen et al. |
| 8,429,346 | B1 | 4/2013 | Chen et al. |
| 8,515,911 | B1 | 8/2013 | Zhou et al. |
| 8,539,148 | B1 | 9/2013 | Chen et al. |
| 8,566,483 | B1 | 10/2013 | Chen et al. |
| 8,583,607 | B1 | 11/2013 | Chen et al. |
| 8,683,153 | B1 | 3/2014 | Long et al. |
| 8,712,976 | B1 | 4/2014 | Chen et al. |
| 8,775,388 | B1 | 7/2014 | Chen et al. |

(Continued)

OTHER PUBLICATIONS

U.S. Appl. No. 15/885,290, filed Jan. 31, 2018, Kucherov.

(Continued)

*Primary Examiner* — Francisco A Grullon
(74) *Attorney, Agent, or Firm* — Daly, Crowley, Mofford & Durkee, LLP

(57) ABSTRACT

Virtual storage domains (VSD) are each associated with unique VSD domain ID associated with a first policy and tagged to a request to a storage system when an entity writes a data set to it. A first hash digest, based on data set content, is calculated and combined with first unique VSD domain ID into a second hash digest associated with data set. When first policy is changed to second policy associated with second VSD, a third hash digest of first data set is calculated, the third hash digest based on content of first data set and on second unique VSD domain ID. If third hash digest does not exist in second VSD, data set is copied to the second VSD; else, reference count of the third hash digest, associated with second VSD domain, is incremented, and reference count of second hash digest, associated with first VSD domain, is decremented.

20 Claims, 8 Drawing Sheets

(56) References Cited

U.S. PATENT DOCUMENTS

| | | |
|---|---|---|
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 8,990,495 B2 | 3/2015 | Hallak et al. |
| 9,104,326 B2 | 8/2015 | Frank et al. |
| 9,141,290 B2 | 9/2015 | Hallak et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,804,966 B1 | 10/2017 | Sadanandan |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 2013/0238571 A1* | 9/2013 | Bates .................. G06F 12/0871 707/692 |
| 2013/0305002 A1* | 11/2013 | Hallak .................... G06F 3/061 711/162 |
| 2018/0276224 A1* | 9/2018 | Natanzon .............. G06F 16/128 |

OTHER PUBLICATIONS

U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.

\* cited by examiner

SMART DATA MOVEMENT AMONG VIRTUAL STORAGE DOMAINS

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer flexibility in decoupling and virtualization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Note that each of the different features, techniques, configurations, etc. discussed in this disclosure can be executed independently or in combination. Accordingly, embodiments disclosed herein can be embodied and viewed in many different ways. For additional details, elements, and/or possible perspectives (permutations) of the disclosed embodiments, the reader is directed to the Detailed Description section and corresponding figures of the present disclosure as further discussed below.

In content addressable storage systems (CAS) such as the DELL EMC XTREMIO product, available from DELL EMC of Hopkinton, Mass., data stored are accessed via unique hash signature generated based on data contents using cryptographic hash functions. For each unique hash signature, the corresponding data only needs to be stored once, since the hash function guarantees that same data always results in the same hash, and a small change to the data would change the hash signature. CAS provides storage efficiency in that only single instance is stored for redundant data. Challenges for such systems can be presented in data usage reporting, security, fault containment, etc., such as in cloud environment where a general storage infrastructure supports diverse needs from multiple applications users and/or tenants. For example, some users may prefer dedicated storage without sharing with others; some users may prefer all their data residing in flash storage for better performance; or some users may use encryption mechanisms to protect their data.

In addition, existing CAS systems can use the same hash function for all incoming data updates. Thus data persistence decision, in some of these implementations, is made solely based on the uniqueness of the data itself with little or no consideration of who owns the data, how data will be stored and accessed, etc. As a result, Users may have little control on fault isolation, data protection levels, or data access control, etc.

At least some of the disclosed embodiments provide systems, methods, and apparatuses that address at least some of these and other issues. In some embodiments, systems, methods, and apparatuses are provided to allow application and user awareness, or multi-tenancy compliance in a content addressable system. In short, a user can define a set of storage efficiency, performance, and/or security policies. The system may map the policies to virtual storage domains (VSD) each with a unique domain ID. The domain IDs may be added to hash functions when the system calculates hash for incoming data.

In addition, at least some of the disclosed embodiments provide systems, methods, and apparatuses that can enable CAS storage clusters, including but not limited to the aforementioned XtremIO product, to better serve cloud environments by providing further ways to change application policies and relocate data. In particular, the policies described herein, which allow dynamically create virtual storage domains (VSD) and which isolate data in different domains, can be further enhanced by permitting users to change application policies and relocate data according to policy changes, which could in term lead to data moving from one VSD to another VSD. To help support these functions, certain embodiments described herein provide techniques for lightweight data movement among VSD utilizing the data hash digest and special hash combine functions.

In certain embodiments, a computer-implemented method is provided. A storage system is configured, the storage system comprising a processor in operable communication with a storage device, the storage device responsive to input/output (I/O) requests to the storage device from one or more entities in operable communication with the storage system. A plurality of virtual storage domains (VSD) in operable communication with the storage system, are configured, where the plurality of VSDs each associated with respective one or more policies, wherein each respective VSD comprises a respective unique VSD domain identifier (ID).

A first unique VSD domain ID is tagged to a request to the storage system when a first entity writes a first data set to the storage system, wherein the tagging is based at least in part on a first policy applicable to the first data set, wherein the first unique VSD domain ID is associated with the first policy. A first hash digest of the first data set is calculated, the first hash digest based at least in part on content of the first data set. The first hash digest is combined with the first unique VSD domain ID into a second hash digest that is associated with the first data set. The first data set is stored in a first VSD associated with the first unique VSD domain ID and is associated with a second unique VSD domain when the first policy is changed to a second policy, wherein the second policy is associated with a second unique VSD domain ID. A third hash digest of the first data set is calculated, the third hash digest based at least in part on the content of the first data set and on the second unique VSD domain ID.

A determination is made whether the third hash digest exists in the second VSD. If the determination is positive, a first reference count of the of the third hash digest associated with the second VSD domain, is incremented, and a second reference count of the second hash digest associated with the first VSD domain is decremented. If the determination is negative, the first data set is copied to the second VSD.

In certain further embodiments, the combining of the first hash digest and the first unique VSD domain ID is configured to preserve a randomness of the first hash digest. In further embodiments, the first unique domain ID comprises an input to the calculation of the second hash digest. In more embodiments, combining the first hash digest and the first unique VSD domain ID into the second hash digest is accomplished using a hash_combine( ) function. In further embodiments, the hash_combine( ) function is configured to combine using the first unique VSD domain ID as a seed and the first hash digest as a value. In additional embodiments, calculating the third hash digest further comprises swapping the out first unique VSD domain ID from the second hash digest and replacing the second hash digest with the second unique VSD domain ID. In still more embodiments, a hash_uncombine( ) function is used to swap out the first unique VSD domain ID and to place the second hash digest with the second unique VSD domain ID.

In a further embodiment, a system is provided, the system comprising a processor, and a non-volatile memory in operable communication with the processor and storing computer program code that when executed on the processor causes the processor to execute a process operable to perform certain operations. One operation comprises configuring a storage system comprising a processor in operable communication with a storage device, the storage device responsive to input/output (I/O) requests to the storage device from one or more entities in operable communication with the storage system. Another operation comprises configuring a plurality of virtual storage domains (VSD) in operable communication with the storage system, the plurality of VSDs each associated with respective one or more policies, wherein each respective VSD comprises a respective unique VSD domain identifier (ID).

A further operation comprises tagging a first unique VSD domain ID to a request to the storage system when a first entity writes a first data set to the storage system, wherein the tagging is based at least in part on a first policy applicable to the first data set, wherein the first unique VSD domain ID is associated with the first policy. A still further operation comprises calculating a first hash digest of the first data set based at least in part on content of the first data set. Another operation comprises combining the first hash digest and the first unique VSD domain ID into a second hash that is associated with the first data set. Yet another operation includes storing the first data set in a first VSD associated with the first unique VSD domain_ID. An additional operation comprises associating the first data set with a second unique VSD domain when the first policy is changed to a second policy, wherein the second policy is associated with a second unique VSD domain ID. Another operation comprises calculating a third hash digest of the first data set, the third hash digest based at least in part on the content of the first data set and on the second unique VSD domain ID.

Additional operations include determining, whether the third hash digest exists in the second VSD, based on a positive determination, incrementing a first reference count of the third hash digest associated with the second VSD domain and decrementing a second reference count of the second hash digest associated with the first VSD domain; and based on a negative determination, copying the first data set to the second VSD.

In another aspect, a computer program product is provided, the computer program product including a non-transitory computer readable storage medium having computer program code encoded thereon that when executed on a processor of a computer causes the computer to operate a storage system. The computer program product includes computer program code for configuring a storage system comprising a processor in operable communication with a storage device, the storage device responsive to input/output (I/O) requests to the storage device from one or more entities in operable communication with the storage system. The computer program product also comprises computer program code for configuring a plurality of virtual storage domains (VSD) in operable communication with the storage system, the plurality of VSDs each associated with respective one or more policies, wherein each respective VSD comprises a respective unique VSD domain identifier (ID).

The computer program product further comprises computer program code for tagging a first unique VSD domain ID to a request to the storage system when a first entity writes a first data set to the storage system, wherein the tagging is based at least in part on a first policy applicable to the first data set, wherein the first unique VSD domain ID is associated with the first policy. In addition, the computer program product includes computer program code for calculating a first hash digest of the first data set based at least in part on content of the first data set.

The computer program product also comprises computer program code for combining the first hash digest and the first unique VSD domain ID into a second hash digest that is associated with the first data set; for storing the first data set in a first VSD associated with the first unique VSD domain ID; and for associating the first data set with a second unique VSD domain, when the first policy is changed to a second policy, wherein the second policy is associated with a second unique VSD domain ID.

The computer program product also comprises computer program code for calculating a third hash digest of the first data set, the third hash digest based at least in part on the content of the first data set and on the second unique VSD domain ID; for determining, whether the third hash digest exists in the second VSD; for incrementing a first reference count of the third hash digest associated with the second VSD domain, and decrementing a second reference count of the second hash digest associated with the first VSD domain, based on a positive determination; and for copying the first data set to the second VSD, based on a negative determination.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
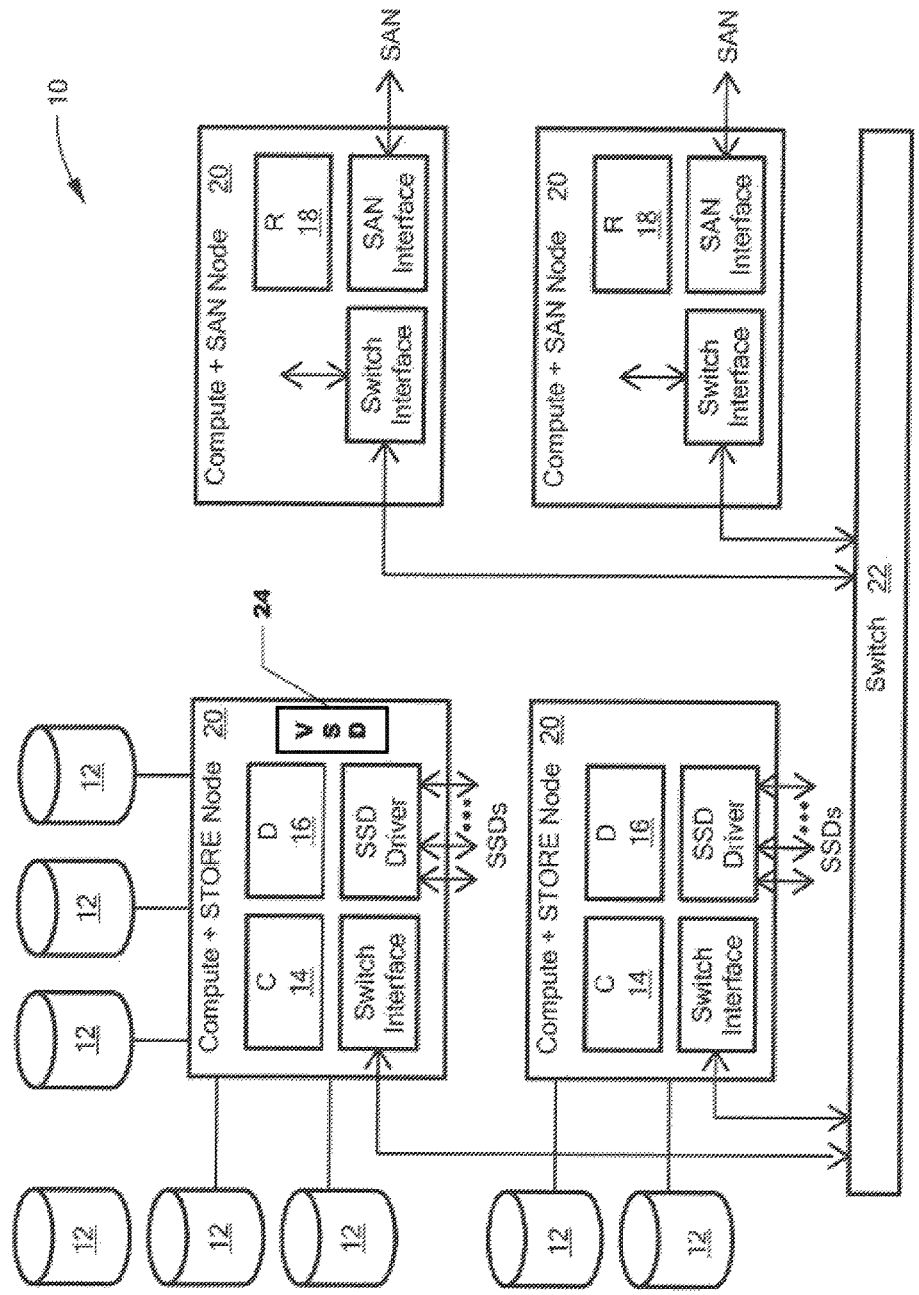
FIG. 1A is a block diagram of a data storage system in accordance with one illustrative embodiment.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

The term "deduplication" refers to a technique used to reduce the amount of storage space and communications bandwidth a system uses to store data. Storage systems often contains duplicate copies of many pieces of data. For example, the same file may be saved in several different places by different users, or two or more files that aren't identical may still include much of the same data. Deduplication eliminates these extra copies by saving just one copy of the data and replacing the other copies with pointers that lead back to the original copy. Deduplication is frequently used in backup and disaster recovery applications, but it can be used to free up space in primary storage as well.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period. In certain embodiments, a snapshot may include one or more dynamic data structures that can include metadata describing user data.

XtremIO, available from Dell EMC of Hopkinton, Mass., is a type of content addressable system array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

In certain embodiments, a tenant is a group of users who share a common access with specific privileges to a single instance of software, such as a software application. where the single software instance runs on a server and serves multiple tenants. Tenants may be given the ability to customize some parts of the application, such as user interface or business rules (e.g., policies), but the tenants generally do not customize the application's code. Tenants can be configured into a multi-tenant storage system In the same way that a virtual machine is protected from other virtual machines on the same hypervisor, in a multi-tenant system, the tenants are also protected from each other, such that one malfunctioning storage tenant would be unlikely to impact another storage tenant and cause data loss. Advantageously, a multi-tenant storage system also enables granular management of specific storage resources. Further, in cloud computing environments, a provider can run one instance of its application on one instance of a database and can provide web access to multiple customers, where each tenant's data is isolated and remains invisible to other tenants.

It is envisioned that at least some embodiments herein are usable with one or more of the embodiments described in certain commonly owned U.S. patents, including: U.S. Pat. No. 9,804,966 ("Methods and Apparatus for Content-Based Storage Addressing with Data Prioritization"); U.S. Pat. No. 9,141,290 ("Snapshot Mechanism"); U.S. Pat. No. 8,990,495 ("Method and System for Storing Data in RAID Memory Devices"); U.S. Pat. No. 9,104,326 ("Scalable Block Data Storage Using Content Addressing") (hereinafter "'326 patent"); and U.S. Pat. No. 9,606,870 ("Data Reduction Techniques in a Flash-Based Key/Value Cluster Storage"), each of which is hereby incorporated by reference.

At least some embodiments herein are described in connection with a networked memory system that includes multiple memory storage units arranged for content addressable system of data. The data is transferred to and from the storage units using separate data and control planes. Hashing is used for the content addressing, and the hashing produces evenly distributed results over the allowed input range. Advantageously, the hashing defines the physical addresses so that data storage makes even use of the system resources. Within the networked memory system, a relatively small granularity may be used, for example with a page size of 4 KB, although this is not intended as limiting; smaller or larger block sizes may be selected at the discretion of the skilled person or as application requirements dictate. In certain embodiments herein, the granularity used is one stripe, where one stripe can contain some number of pages or some number of storage block on disk, but this is not limiting.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein. In addition, the phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" may be used herein to mean that a feature or process, etc., is provided in some embodiments and not provided in other embodiments." Any particular embodiment of the invention may include a plurality of "optional" features unless such features conflict.

FIG. 1A is a block diagram of a data storage system in accordance with one illustrative embodiment. In particular, FIG. 1A illustrates a system 10 providing scalable block data storage and retrieval using content addressing, which is usable in accordance with certain embodiments described herein. Referring to the embodiments of FIG. 1A, the data storage system 10 includes a plurality of nodes 20 connected over a network by a switch 22 where the system may map policies to virtual storage domains (VSD) each with a unique domain ID. Also shown is a Virtual Storage domain (VSD) 24. The system 10 includes data storage devices 12 on which data blocks are stored. One or more of data storage devices 12 may be production volumes, which are used by the storage system during processing of IO requests. Each node 20 includes one or more computing modules, such as control modules (C) 14, data modules (D) 16, and routing modules (R) 18. In many embodiments, a given node may include at least one of a routing, control, or data module. In certain embodiments, a node may include a multiplicity of any or all of these modules.

The modules carry out content addressing for storage and retrieval, and the network defines separate paths or planes, control paths or a control plane which goes via the control modules 14 and data paths or a data plane which goes via the data modules 16. The storage devices 12 are networked to computing modules, including control modules 14 and data modules 16. The control modules 14 control execution of read and write commands. The control modules 14 contain the address to hash mapping table which is the first layer of indirection. Data services such as snapshots, de-duplication, and thin provisioning, are handled in the control modules 14 in example embodiments.

The data modules 16 are connected to the storage devices 12 and, under control of a respective control module 14, pass data to or from the storage devices 12. The data modules 16 contain the hash to physical (H2P) Solid State Drive (SSD) address mapping. The data modules 16 are also responsible for 10 operations to the SSDs themselves, as well as managing the data protection scheme. In a particular embodiment the data module may include a plurality of counters 28.

Routing modules 18 route processing throughout the system 10. In some embodiments, routing modules may terminate storage and retrieval operations and distribute command parts of any operations to control modules that are explicitly selected for the operation in such a way as to retain balanced usage within the system. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

In certain embodiments, the computing modules (e.g., data, control, and/or routing modules) may include executable computer code configure to perform processing described below in conjunction with FIGS. 3 and 4. In many embodiments, each node runs multiple processes in parallel.

In some embodiments, the computing modules may carry out content addressing for storage and retrieval. In certain embodiments, control and data modules may retain extracts of the data stored in the storage device, and the extracts may be used for the content addressing. In many embodiments, the extracts may be computed by cryptographic hashing of the data, e.g., the hash (H) modules may calculate hash values for data that are the subject of I/O commands, and the hash values may later be used for retrieval. In particular embodiments, hashing used for the content addressing produces evenly distributed results over the allowed input range. The hashing defines the physical addresses so that data storage makes even use of the system resources.

In certain embodiments, data is stored in blocks, where each block has a unique hash signature. In some embodiments, relatively small granularity may be used for blocks, for example with a block size of 4 KB, although smaller or larger block sizes may be selected. In many embodiments, a user I/O request larger than 4 KB or other system-determined block size may be converted into a plurality of I/O operations within the system, each one separately hashed and separately processed.

In particular embodiments, data blocks are stored to solid-state disks (SSDs). In some embodiments, a data storage system is a flash-based key/value cluster storage array. In some embodiments, the storage devices may include solid-state random access storage devices. In other embodiments, the storage devices may include spinning disk devices, or spinning devices may be used instead. The modules can be combined into nodes 20 on the network, and the nodes are connected over the network by a switch 22.

The use of content addressing with multiple data modules selected on the basis of the content hashing, and a finely grained mapping of user addresses to Control Modules, allows for a scalable distributed architecture.

In some embodiments, a content addressable system (CAS) can be used to ensure that data appearing twice is stored at the same location (e.g., to identity and avoid duplicate write operations). For example, in some embodiments, the routing modules 18 and/or data modules 16 may compare the extracts or hash values of write data with hash values of already stored data, and where a match is found, simply point to the matched data and avoid rewriting. n many embodiments, CAS can be used to provide de-duplication within a data storage system, ensuring that the same data is not stored twice in different places.

In some embodiments, the separation of control and data may enable a substantially unlimited level of scalability, since control operations can be split over any number of processing elements, and data operations can be split over any number of data storage elements. In many embodiments, the separation of control and data may provide one or more of the following: (a) parallel operation of certain control and data actions over multiple nodes/modules; (b) use of optimal internal communication/networking technologies per the type of operation (control or data), designed to minimize the latency (delay) and maximize the throughput of each type of operation.

In many embodiments, routing modules may use hash values, calculated from data associated with the operations, to select the control module for the distribution. In certain embodiments, a control module may be selected based on a user-specified address. In many embodiments, the hash value may be used for selecting the data module, and for setting the physical location for data storage within the data module. In some embodiments, the routing modules and/or data modules may provide deduplication by comparing the extracts or hash values of write data with hash values of already stored data and where a match is found, simply point to the matched data, and avoid rewriting.

In various embodiments, routing modules may decouple data storage patterns from I/O patterns. In some embodiments, a routing module may break up incoming blocks that are larger than a given granularity size and send the relevant parts to the appropriate control modules. In many embodiments, a control module may handle a range or set of addresses within a logical unit (LU). In particular embodiments, a control module may break up a block it receives for distribution to data modules, at a pre-determined granularity. In one embodiment, a request to write a sixty-four (64) KB block may end up being broken up into sixteen (16) internal writes, each write comprising a four (4) KB block.

Embodiments provide virtual storage domains for content addressable system enabling single instance storage at a finer granularity at storage domain level, as opposed to at an entire system level. Users may configure tenant data storage policies for data streams or application data, which could include but are not limited to shared/exclusive storage, data protection level, encryption policy, storage tiers, etc.

In embodiments, the storage system creates virtual storage domains based on the data set policy, with domain IDs unique for each domain. If two policies allow data sets to be shared together, they are allowed in the same storage domain and thus assigned the same domain ID; otherwise, the data sets will be in different domains.

When data belonging to a certain set gets written to the storage system, the policy engine tags the corresponding domain ID to the data request based on the data set policy.

Hash function in the system takes both the data content and the domain ID as input to calculate hash signatures for the data. The same data in different domains will be assigned different hash signatures, and thus stored in different physical locations. The system could also look at tagged domain ID of data, and allocates physical data location from different storage tiers of a given storage domain.

When user retrieves data, the policy engine looks up the domain ID first based on the policy and then sends the data read request tagged with domain ID. Data access isolation and performance may then be achieved within a domain boundary.

Since the storage domains are virtually created, data are allowed to move in between domains. This can be done via choosing hash functions, and rehashing data that needs to be moved, duplicated, etc. Similarly, domains may also be split or merged with policy configuration changes.

Figure 1B:
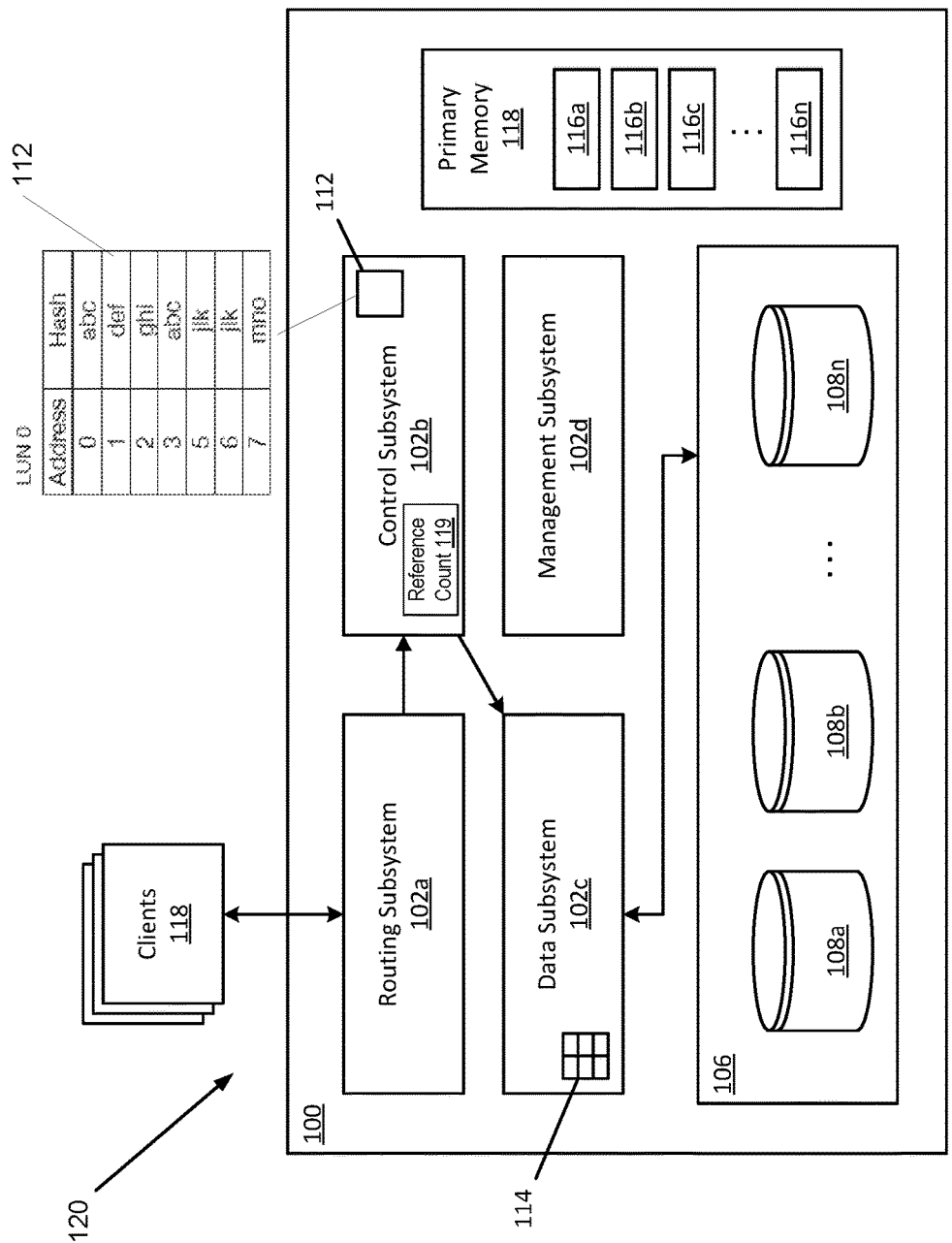
FIG. 1B is a simplified block diagram of a content-based storage system, in accordance with at least one illustrative embodiment of the disclosure.

FIG. 1B shows a storage system 100 according to an illustrative embodiment of the disclosure, which is usable with at least some embodiment described herein. The storage system 100 may be the same as or similar to a node 20 within the distributed storage system 10 of FIG. 1A. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random access storage devices, such as solid-state devices (SSDs).

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application-programming interface (API) and to translate client I/O operations into internal commands. In some embodiments, the routing subsystem 102a is configured to receive commands from small computer system interface (SCSI) clients 118. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1B, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout, In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-6. In some embodiments, the management subsystem 102d can also be configured to monitor other subsystems 102 (e.g., subsystems 102a-102c) and to use this information to determine when the storage system 100 may begin processing client I/O operations after a restart.

A subsystem 102 may store various types of information within primary memory 118. For example, the control subsystem 102b may store some or all of the information within the A2H table 112 in primary memory 118. Likewise, the control subsystem 102c may store some or all of the information within the H2P table 114 in primary memory 118. In some embodiments, subsystems 102 cache metadata within primary memory 118 to improve system performance. In some embodiments, a subsystem 102 may maintain a change journal to efficiently handle changes to metadata or other information. Such change journals may also be stored in primary memory 118. For example, in certain embodiments, a subsystem's dynamic memory requirements may include metadata used to process I/O operations. In other embodiments, metadata stored within a process memory space may include address-based metadata (e.g., information used within the A2H table 112 of FIG. 1B) and hash-based metadata (e.g., information used within the H2P table 114 of FIG. 1B). It will be appreciated that the actual amount of metadata used by a subsystem may depend on the client I/O patterns which, in general, are a priori unknown. Thus, in some embodiments, a fixed amount of memory is allocated to each subsystem for metadata and it is left to the subsystem (or its components) to utilize the memory as appropriate. In one embodiment, a subsystem 102 may require up to 128 GB of primary memory to function normally.

In an example I/O operation in the system 120 of FIG. 1B, a client 118 may issue a read or write command for a logical block address (LBA), via a port (not shown), such as a Fibre Channel or iSCSI port, for example. The routing subsystem 102 may receive the read or write command and determine a requested address range in data blocks of a predetermined size (e.g., 4K), and pass the address information to the control subsystem 102b. The control subsystem 102b may look up the address in the A2H table 112 to obtain the hash value. For example, for a request for LBA 6 would result in Hash "jlk," as shown in the table 112. In certain embodiments, this may be referred to as address-to-hash (A2H) lookup, as described above. The "jlk" hash value may be passed to the data subsystem 102c which can perform a look up of the "jlk" hash value in the hash-to-physical address (H2P) table 114 to read the physical address for the data. The data subsystem 102c can use the physical address to read a particular data block (DB) at a certain physical address in one of the memory devices in storage array 106 (which can in certain embodiments, be a part of a virtual storage domain (VSD)). A reference count 119 can correspond to a number of times the hash value is referenced in physical storage (or in a VSD).

Figure 2:
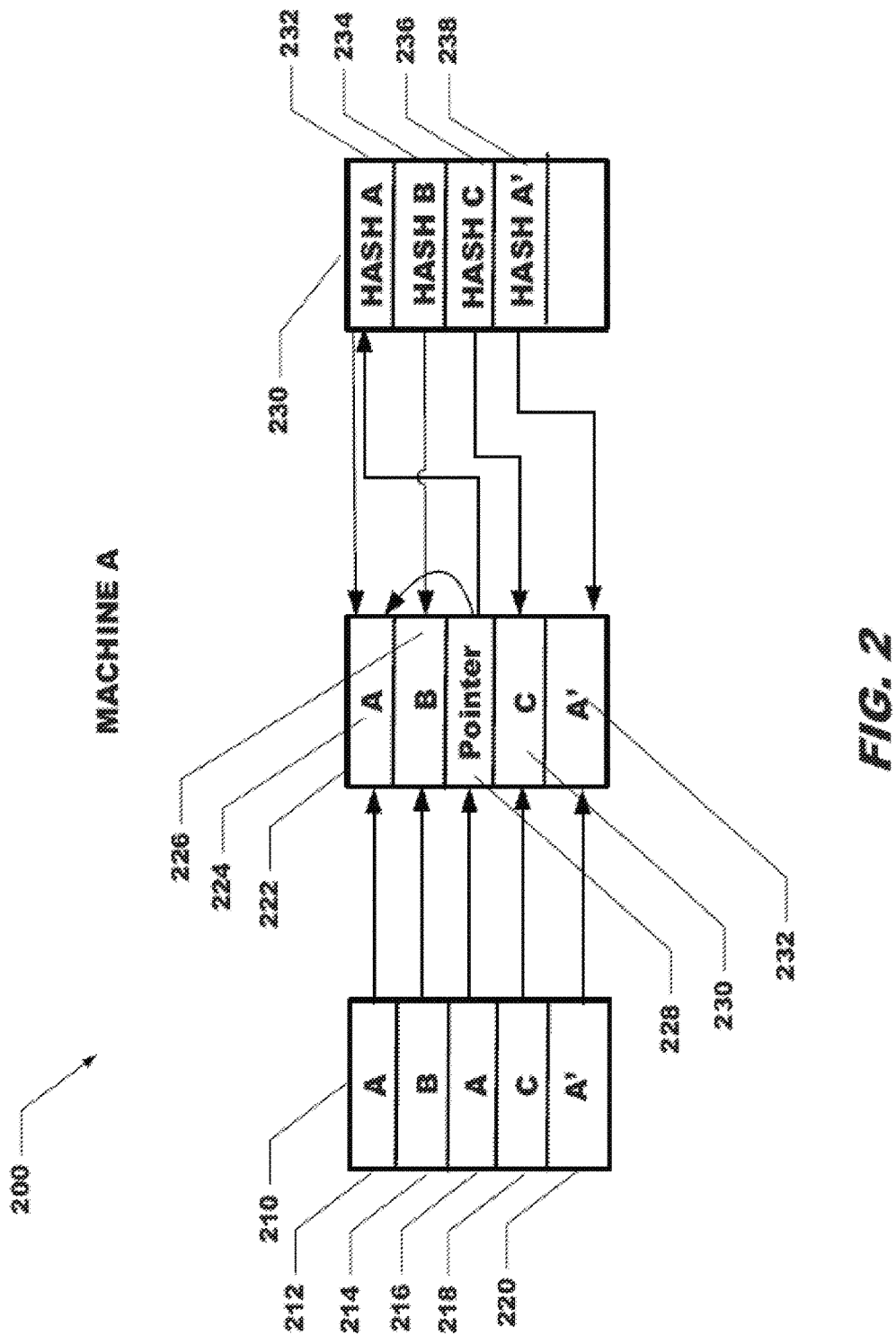
FIG. 2 is a diagram illustrating an example data layout for storage devices, in accordance with illustrative embodiments.

Referring now to FIG. 2, an environment 200 for providing virtual storage domains for a content addressable system, in connection with certain embodiments, is shown. A storage device 210, receives data and stores data. As shown in storage device 210, the storage device has received data A and stored it in location 212. Data A 212 is associated with a first policy. Storage device 210 has received data B and stored it in location 214. Storage device 210 has received data A (same data as in location 210 and associated with the same policy) and stored it in location 216. Storage device 210 has received data C and stored it in location 218. Storage device 210 has received data A' (same data as in location 212 and 216 but is associated with a second storage policy that is different than the first policy) and stored it in location 220.

Storage device 222 is configured for performing deduplication and storage. Initially the deduplication device 222 does not have any data stored thereon. As shown in storage device 222, the device has received data A and checks to see if the storage array that device 222 is on already has a copy of data A stored thereon. The storage array device 222, at this time, does not have a copy of data A stored thereon, so the deduplication device 222 stores data A in location 224. Deduplication device 222 has received data B and again checks to see there is an existing copy of data B. The storage array deduplication device 222 doesn't have a pre-existing copy of data B, so deduplication device 222 stores data B in location 226. Deduplication device 222 has received data A from location 216 and checks to see if there is an existing copy of data A on the deduplication device. The storage array deduplication device 232 does have a copy of data A already stored thereon (location 224), so instead of duplicating the data by storing data A again at location 228, instead deduplication device stores a pointer to location 224 which contains data A. Deduplication device 222 has received data C and checks to see if there is an existing copy of data C on the array. The array deduplication device 222 doesn't have a copy of data C previously stored on the device, so data C is stored in location 230. Duplication device 222 has received data A from location 220 and checks to see if there is an existing copy of data A on the array. The array deduplication device 222 does have a copy of data A but data A is associated with a different data policy which is associated with a virtual storage domain, so instead of storing a pointer to location 224 which contains data A, this data (referred to as data A') is stored in location 232.

In one example, a pointer may require only twenty bytes of data, whereas a data block may require eight kilobytes of storage. Since a pointer takes up much less space than a regular data block entry, significant storage space is saved by the deduplication methodology. As shown, deduplication results in storing the data once and storing a pointer for other occurrences of the same data.

Hash table 230 shows the hash value for each data entry. Hash A 232 is a hash of data A in location 224, hash B 234 is a hash of data B at location 226, and Hash C has a hash of data C in location 236, and hash A' is stored in location 238. The pointers also point to the corresponding hash in the hash table. For example, the pointer at location 228 also points to HASH A in location 232 of hash table 230. The hash table entries also point to the corresponding data stored on the deduplication device 222. In this manner if data A is moved, the pointers in locations 228 and 232 still point to the hash of A. In such a manner, an additional layer of granularity is used for storing data wherein the data policy is used to distinguish similar data within a storage system.

Figure 3:
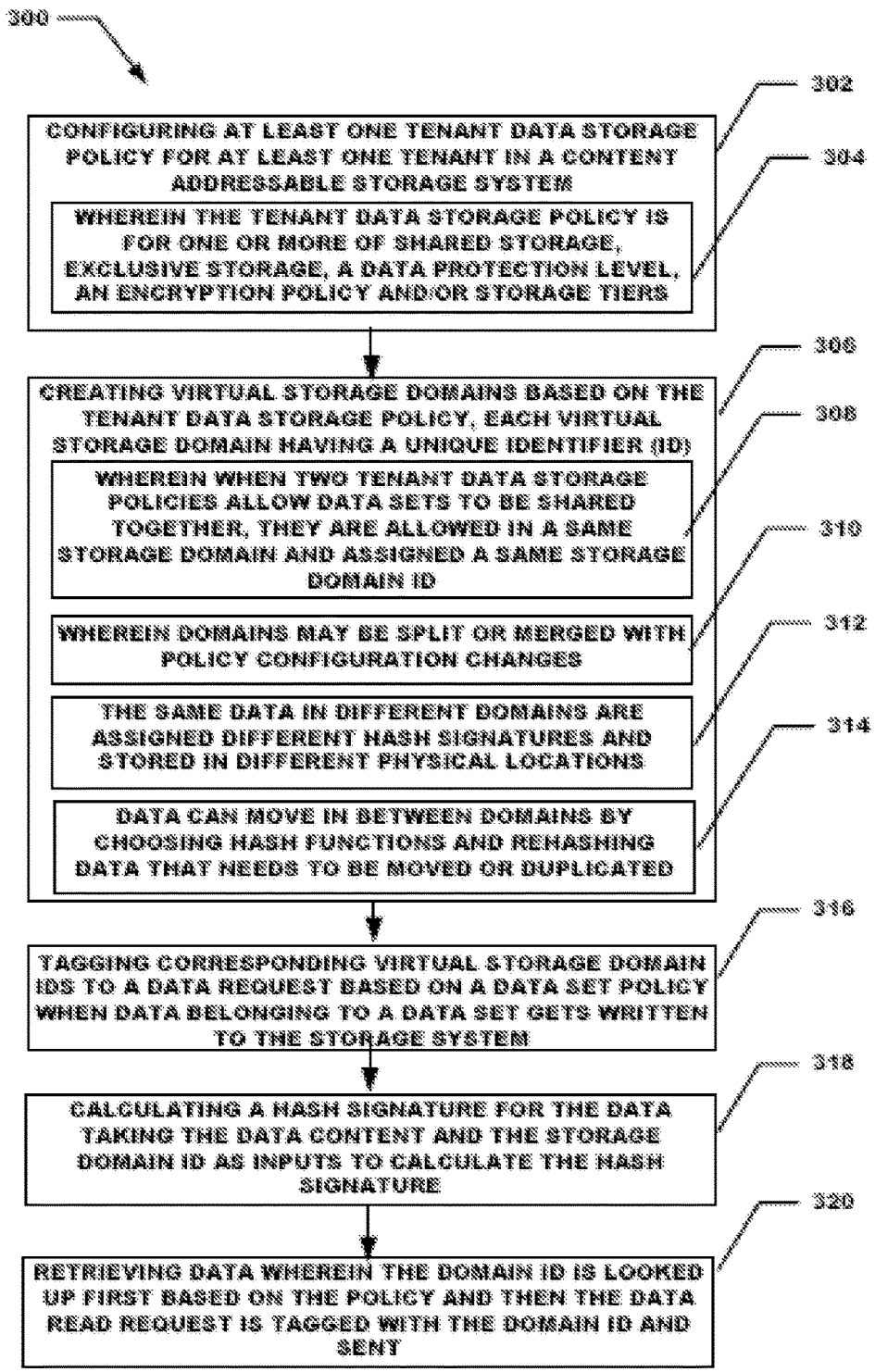
FIG. 3 is a flow chart of an illustrative process providing virtual storage domains for a content addressable memory.
Figure 4:
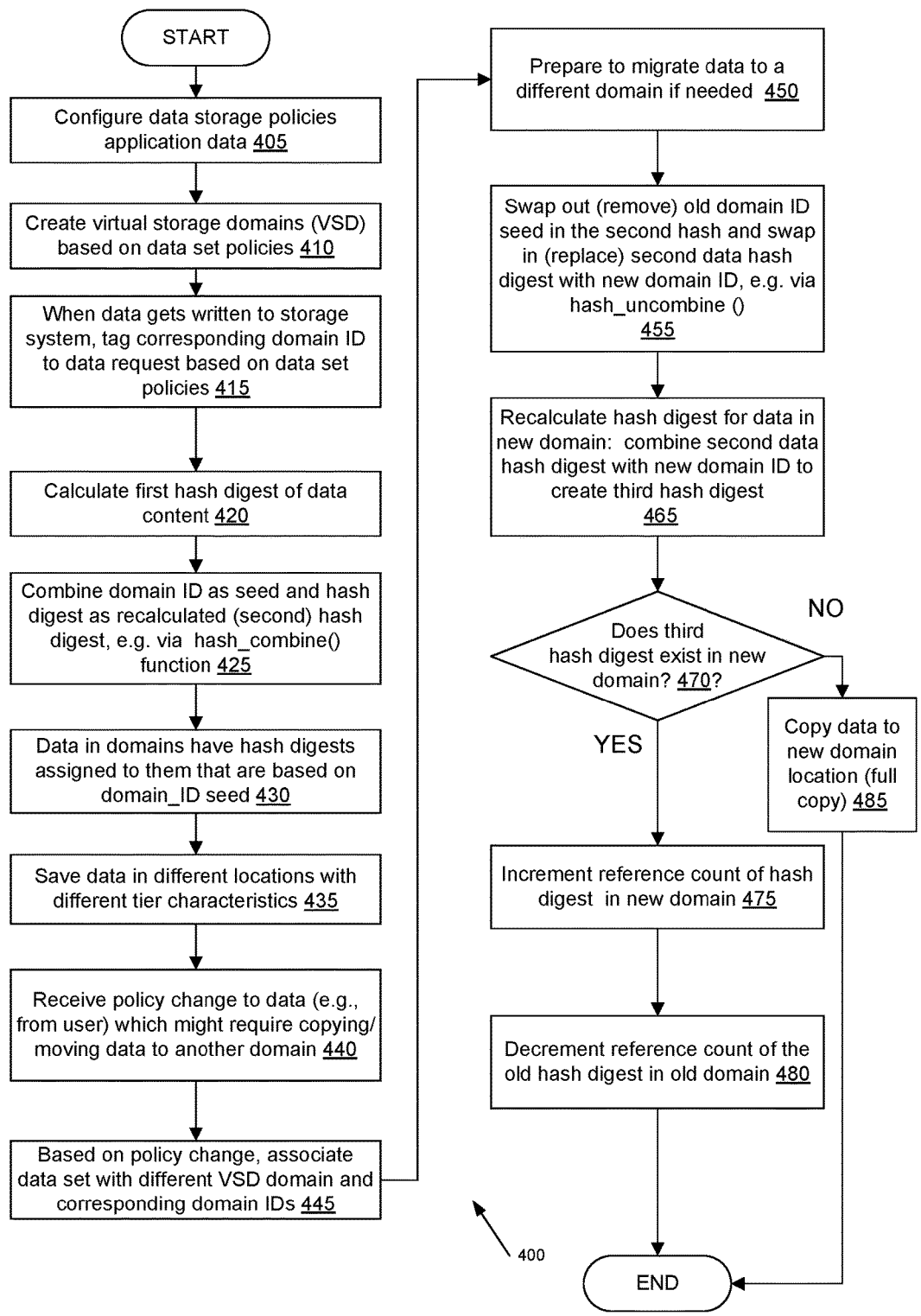
FIG. 4 is a flowchart of an illustrative process for data movement among virtual storage domains.

In the flow charts of FIGS. 3 and 4 herein, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

FIG. 3 illustrates a particular embodiment of a method providing virtual storage domains in a content addressable system. The method 300 begins with processing block 302 which shows configuring at least one tenant data storage policy for at least one tenant in a content addressable storage system. Different tenants may have different storage policies. As shown in processing block 304 a tenant data storage policy may be for one or more of shared storage, exclusive storage, a data protection level, an encryption policy and/or storage tiers.

Processing block 306 discloses creating virtual storage domains based on the tenant data storage policy, each virtual storage domain having a unique identifier (ID). As shown in processing block 308 when two tenant data storage policies allow data sets to be shared together, they are allowed in a same storage domain and assigned a same storage domain ID. Processing block 310 shows that domains may be split or merged with policy configuration changes. Processing block 312 discloses wherein the same data in different domains are assigned different hash signatures and stored in different physical locations. Processing block 314 recites data can move in between domains by choosing hash functions and rehashing data that needs to be moved or duplicated.

Processing block 316 shows tagging corresponding virtual storage domain IDs to a data request based on a data set policy when data belonging to a data set gets written to the storage system.

Processing block 318 discloses calculating a hash signature for the data taking the data content and the storage domain ID as inputs to calculate the hash signature.

Processing block 320 recites retrieving data wherein the domain ID is looked up first based on the policy and then the data read request is tagged with the domain ID and sent.

As described above, the disclosed techniques enable, for at least some embodiments, CAS storage clusters such as XtremIO to better serve cloud environments and help to implement providing a virtual storage domain for a content addressable system. Once users gain flexibility in dynamically creating virtual storage domains (VSD) and isolating data in different domains, one or more users may want to change application policies and relocate data according to policy changes, which may in term lead to data moving from one VSD to another VSD.

One concern with the changing of policies and the data movement is the associated cost in CPU utilization. Generally, to support the concept of the VSD in existing CAS infrastructure, the VSD IDs are used as part of the hash function input. Thus, in some instances, with no optimization, data movement from one VSD to another VSD could be equivalent to a regular read and regular write, which can makes data movement among VSDs a costly activity in terms of CPU utilization. In certain embodiments, changes in policies and relocation of data can involve having multiple copies of data, in different locations, if their policy and metadata are different. Depending on the policy settings, such multiple copies may be necessary (e.g., if multiple copies are needed for different policy settings). However, it is also possible that data movement, via regular read and write, could trigger deduplication or single instancing efforts that could be avoided otherwise.

Still another concern is the impact on a system of a customer changing policies, such as whether to move hashes, and what is the best way to either move data from one virtual domain to another, or to determine that such movement of data may not be needed because the data may already be in the other virtual domain. Generally, when a policy is changed for a storage object, the domain membership for the storage object changes, as well. It is advantageous to have ways to avoid having to make unnecessary additional copies of data in the new domain, when a policy is changed and when that particular policy change requires or triggers data moving from one virtual storage domain (VSD) to another VSD. In certain embodiments, it advantageous if there was a way to leverage the single instance framework of the infrastructure into which the storage object is built and, if possible, avoid copying actual data.

To help address at least some of these issues and to help improve performance in various types of systems, in certain embodiments, methods, apparatuses and processes are proposed herein to help provide a lightweight data movement among VSD, utilizing the data hash digest and hash combine functions. In certain embodiments, the concept of a virtual storage domain (VSD) provides flexibility by treating domain metadata as integral part of the data itself. In particular, additional embodiments described herein further optimize the embodiments described previously herein, by utilizing the existing infrastructure of the CAS system and making use of a specially designed hash combine function to support dynamic data movement among VSDs in a more efficient manner.

In certain embodiments, the hash digest is recalculated to minimize later computation cost that would result by having to make another copy of the storage object, in the new domain, after a policy change. The recalculated hash is then compared to hash digests that are already present in the new storage domain of the storage object whose policy has been changed, to determine, based on the comparison, if there is a match to the hashes of any other data objects or data sets in the new domain. In certain embodiments, a comparison is made between every block of the storage object that needs to be moved between VSDs. If the hash digests match, that is indicative that the storage object (e.g., its data) and its policy also match, so it is not necessary to have to make a copy of the storage object in the new domain. Instead, it is possible to increment the reference to that new hash in the new domain, and then decrement the reference to the old hash in the old domain. As one of skill in the art will appreciate, not having to make additional copies can result in considerable improvements in efficiency in this and other processes.

Figure 5A:
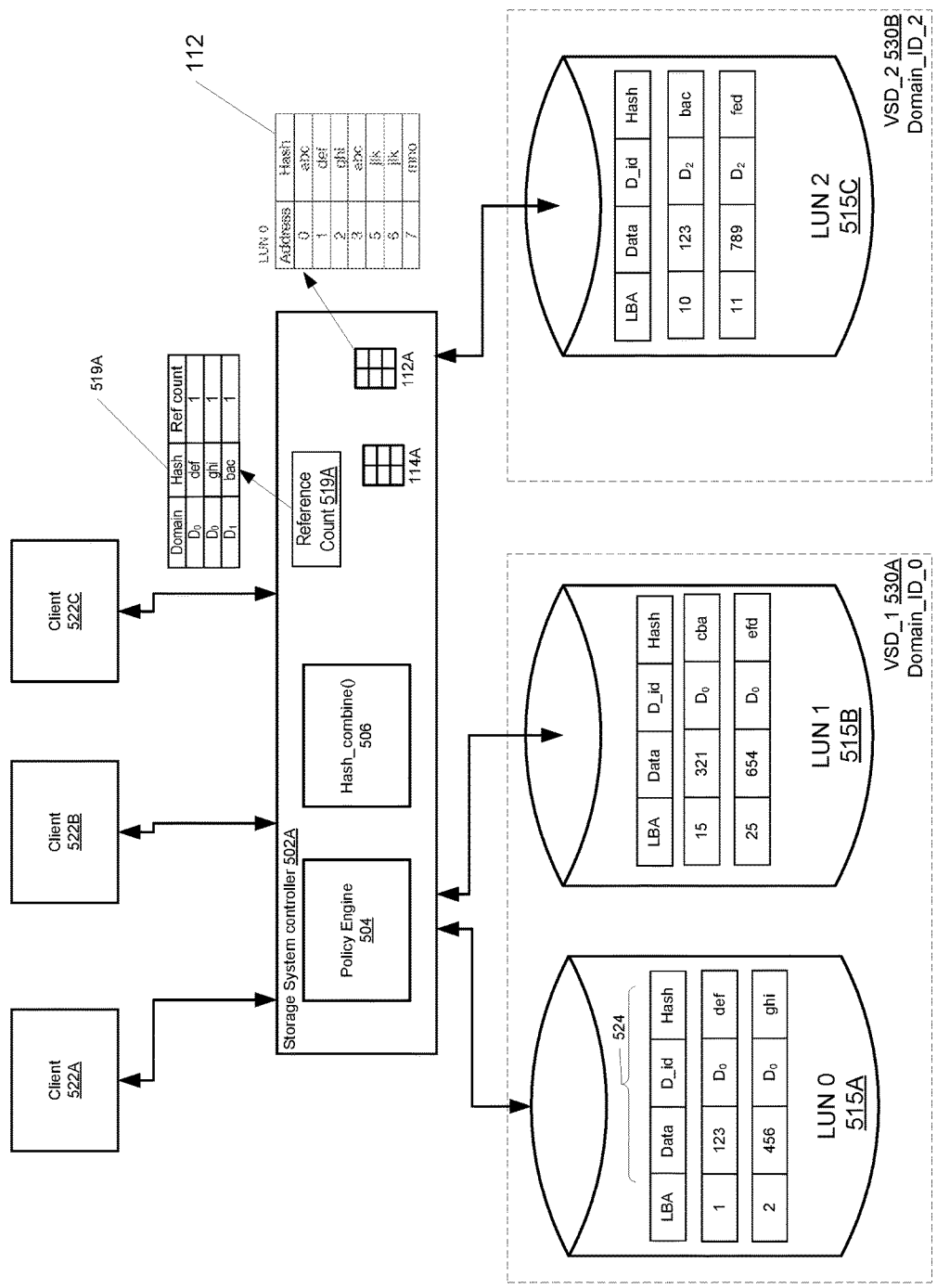
FIGS. 5A and 5B are simplified views of an exemplary CAS system showing change in data associations from one domain to another, during execution of the flowchart of FIG. 4.
Figure 5B:
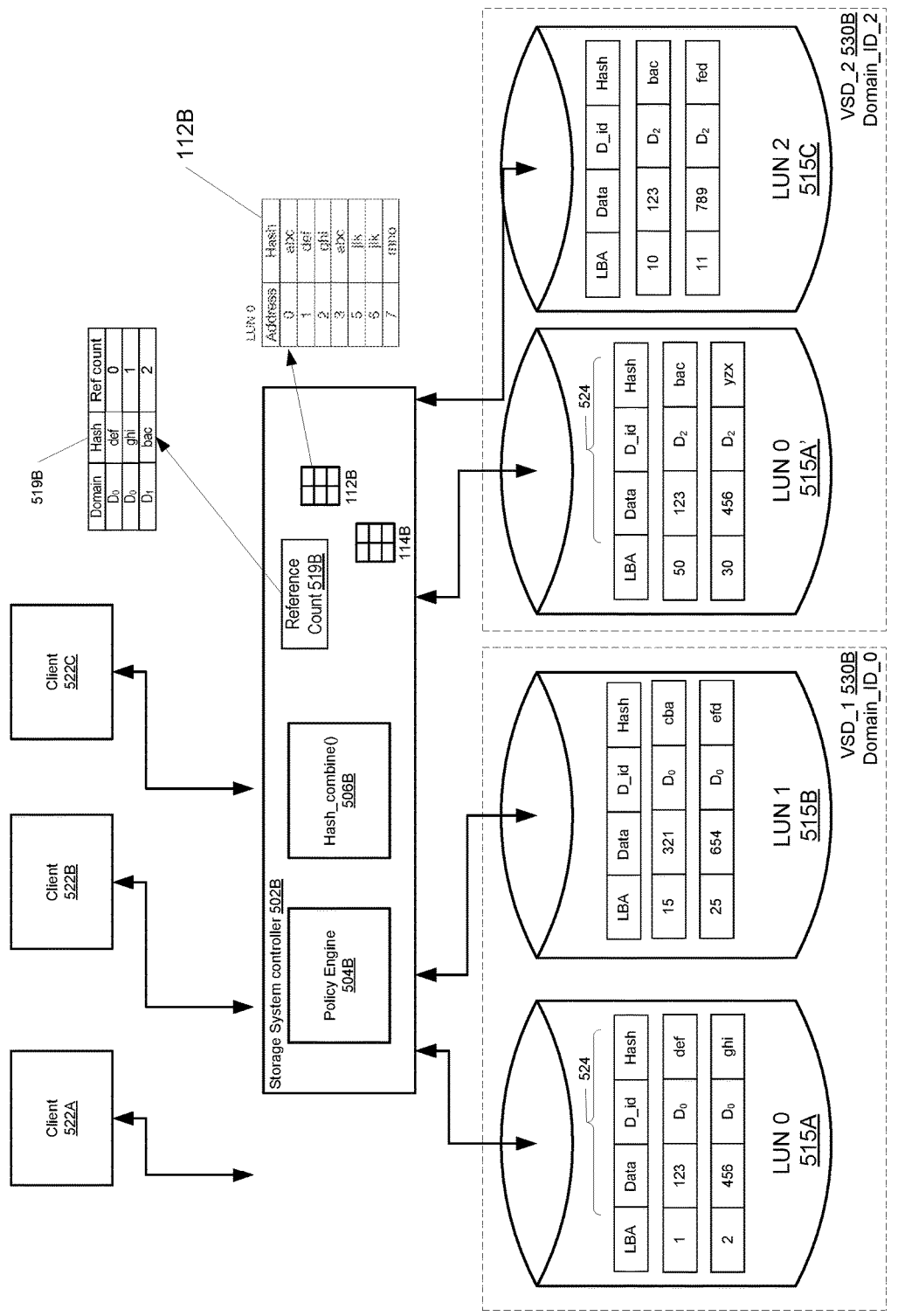

The following description in FIGS. 4-5B, in combination with the teachings of FIGS. 1A through 3, describes various implementations of various embodiments that help to provide hash optimized data movement among the VSDs.

FIG. 4 is a flowchart 400 of an illustrative process for data movement among virtual storage domains, in accordance with some embodiments described herein, and FIGS. 5A and 5B are simplified views of an exemplary CAS system showing change in data associations from one domain to another, during execution of the flowchart of FIG. 4. FIGS. 5A and 5B show an simplified system 500 before a policy change (FIG. 5A) and after a policy change (FIG. 5B)

Referring briefly to the illustrative embodiments of FIGS. 5A and 5B, each shows a system 500A, 500B where a plurality of clients 522 communicate with the storage system controller 502 of the system 500 to read and write data to a plurality of LUNs 515 that are configured into a plurality of virtual storage domains 530. In certain embodiments, one or more elements of the illustrated system 500A, 500B can be implemented using or part of a cloud-computing environment. Advantageously, the simplified systems 500A, 500B can be part of and/or in communication with the data storage systems described above in FIGS. 1A and 1B.

The storage system controller 502, in certain embodiments, includes data structures similar to those described above in FIG. 1B, such as the address-to-hash (A2H) table 112 and the hash-to-physical address (H2P) mapping table 114, a reference count 119, and also includes a policy engine 504, which cooperates with clients 522 that want to configure application data for tenant data storage policies (e.g., shared/exclusive storage, data protection level, encryption policies, storage tiers, etc.). The storage system controller 502 is in communication with several virtual storage domains 530, which each comprise one or more LUNs 515. Each VSD 530 has its own unique domain identifier (domain_id), and each respective LUN 515 can store data D at a logical block address (LBA) that is tagged with a respective domain identifier D_id, where the data D also has assigned to it a hash value H that is based on a hash digest "Hash" of the data D. As can be seen in FIG. 5A, for example, in LUN 0 515A is associated with Domain_ID_0 (also referred to herein as "$D_0$" in more compact form), at logical address "1" data object 123" has a hash "def" and is associated with D_id "$D_0$." The domain_ID_0 may be associated, for example, with a first type of policy. Similarly, in LUN 2 515C, it can be seen that the same data object "123" is stored at logical address "10" and has a hash of "bac," and is associated with D_id "$D_2$."

Referring now to FIGS. 4, 5A, and 5B, similar to what was described above in the flowchart of FIG. 3, in the blocks of FIG. 4, users, such as the clients 522, configure tenant data storage policies application data, which in certain embodiments includes, but is not limited to, shared/exclusive storage, data protection level, encryption policy, storage tiers, etc. (block 405), such as via policy engine 504. The storage system 500 creates virtual storage domains 530 based on the data set policy, with domain IDs unique for each domain (block 410). When data (e.g., data objects or data sets) belonging to certain sets get written to the storage system, the policy engine tags corresponding domain ID (e.g., D_id as shown in the storage system 500) to the data request based on the data set policy(ies) (block 415)

In block 420, the system 500 calculates a first hash digest of data content and then uses a hash_combine ( ) function 506 (block 425) to combine the domain ID as a seed and hash digest to be a new (second) hash digest, where the new hash digest is stored in the same manner as other hash digests stored on the storage cluster. That is, after computing a first hash digest of the data (block 420), the hash digest is recalculated using both the first hash digest and the domain_ID associated with where the data is being written to (note that the method of FIG. 4 also can be applicable to data reads, where it can be determined if the data to be read is already available in a given domain, using the same techniques, etc.). The "new" second hash digest computed in block 425 differs from the "old" first hash digest, in that the "old" first hash digest is based on data only, whereas the "new" second hash digest is based on both data and domain ID. This way, the change in hash digest effectively is transparent to the data module (e.g., the LUN 0 that stores data based on the hash digest). In certain embodiments, a block is stored in a LUN 515 of the vsd 530, e.g., as data block 524 that includes a data portion D, a domain_id portion D_id, and a hash digest portion labeled as Hash, as is illustrated in the LUNs 515 of FIG. 5A In some embodiments, the hash_combine function has the format hash_combine (seed, value). In one embodiment, inspired by and adapted from a hash_combine( ) implementation from the standard Boost C++ library, one example implementation of a hash combine VSD domain ID with data hash digest while preserving all the randomness of original data hash digest, could be:

```
inline void hash_combine (vad_id,data)
{
newhash_digest  (hash(data)+SALT_CONST+(vsd_id«
   LEFT_SHIFT_BITS)+(vsd_id»RIGHT_SHIFT))^
   vsd_id;
}
```

Still another illustrative example of a hash_combine( ) implementation, is another adaptation of the hash_combine implementation in the Boost C++ library:

```
template <class T>
inline void hash_combine(std::size_t& seed, const T&v)
{
std::hash<T> hasher,
seed^=hasher(v)+SALT_CONST+(seed<<6)+(seed>>2)
}
```

Because the two different VSD domains 530A, 530B each have different respective vsd_id (i.e., different domain ID seeds) (e.g., D_id=$D_0$ and, D_id=$D_2$ in FIGS. 5A, 5B), the same data in different domains will have and are assigned different, new respective hash digests (also referred to as hash signatures) (block 430), which are at least partially based on the domain ID seed and thus necessarily will differ from domain to domain if the domains each have substantially unique identifiers associated with them. This can be seen, for example, in FIG. 5A, where the data block 524 in LUN 0 in VSD 530A, shows data "123" has a hash of "def," whereas the same data "123" stored in a different domain, domain_id 2, in LUN 2, has a hash of "bac". This same data thus can be stored in different physical locations with different storage media characteristics and/or different tiering characteristics (block 435). It will be appreciated, of course, that the actual data shown and corresponding hashes shown in FIGS. 5A and 5B are merely illustrative and not limiting. Also, in these examples, the term "domain_id 0" in the block diagram is similar to the term "$D_0$" as domain identifier in the data 524 (and the same goes for domain_id 2" and "$D_2$").

If a user (e.g., client 522A) or other entity decides to change the policy associated with certain dataset, or to add a new policy, or remove an existing policy, if such a user policy change is received (block 440), and the user policy is of a type that requires copying and/or moving data to another domain, the system associates the data set with different VSD domain and domain IDs (block 445). Thus, in certain embodiments, changing a policy associated with a data set can trigger the actions of blocks 440-485, as a result of the policy changes, if data migration, such as via copying, is needed. In certain embodiments, however, the policy change may or may not require data movement, as well be understood.

In one example, an illustrative example of a policy change could be to add a policy of storing a particular dataset in storage having particular characteristics, such as being a fast type of storage. Another illustrative example of a policy change could be to change a policy from a restricted access to data to allowing open access to data. Those of skill in the art will appreciate that many different types of policy changes are possible. It also will be appreciated that not all policy changes necessarily will trigger a domain ID change. In addition, it will be understood that the embodiments described herein are not limited to configurations where there is a one-to-one mapping from policy to domain ID. In certain embodiments, multiple policies could be mapped to the same VSD. For example, in certain embodiments, a policy could specify different levels of security access control that would not have implications on the storage domain, as well be understood.

In the illustrative example of FIGS. 5A-5B, one exemplary change being depicted is a user requesting a policy change for LUN 0 of VSD_1, wherein the policy change requires moving LUN 0 515A from VSD_1 to VSD_2, including associating the data "123" and data "456" in LUN 0 with a different VSD, in this example VSD_2.

Referring again to FIGS. 4, 5A, and 5B, in certain embodiments, the system can prepare to migrate data to the different domain (block 540) by swapping out (removing) the "old" the domain ID seed in the hash (which would have corresponded to the domain $D_0$ in FIG. 5A, which is the one in which the policy is changing) and by swapping in (replacing) the second data hash digest (which was created in block 425 and which was associated with data stored in domain $D_0$) (block 455). For example, in one embodiment, swapping out the domain ID seed in the hash is accomplished by applying an exclusive-OR operation to XOR out the old domain ID and combining the data hash digest with the new domain ID (block 465) to create a third hash digest.

In certain embodiments, the process of calculating another new "third" hash digest uses a function such as a hash_uncombine function. For example, the old domain ID can be swapped out and the "new" domain_ID can be swapped in to replace the second data hash using the "hash_uncombine" function, as shown below.

```
hash_uncombine (new_hash_digest, vsd_id)
{
data_hash_digest=new_hash_digest^vsd_id-SALT_
   CONST-vasdjd«LEFTSHIFT_BITS)-(vsd_id»RI-
   GHT_SHIFT;
}
```

In certain embodiments, use of the above-described hash_combine and hash_uncombine features is advantageous because it enables recalculation of the hash digest of the <domain_id, data> without recalculating for the entire data stream. Furthermore, it is not even necessary, in certain embodiments, to persist the original hash digest (i.e., the "first" or "second" hash digests), because the result of hash_uncombine( ) is the original hash digest (that is, the one that was used as the value in the hash_combine operation), because the result of hash_combine( ) is the new hash with both original hash and domain ID info.

Referring again to FIGS. 4, 5A, and 5B, if the newly calculated hash exists in the new domain (answer is YES at block 470), then what can be done, in certain embodiments, is to simply increment the reference count of the hash in the new domain (block 475), and decrement the reference count of the old hash in the old domain (block 480). For example, referring to FIGS. 5A and 5B, for the data shown as "123," and "456" in LUN 0, assume that client 522A wants to update its policy for its data, which results in this data, along with entire LUN 0, being moved to domain_id 2 ($D_2$). Note that FIG. 5A also shows reference counts 519A for the system in this state. Assume that client 522A's data is data "123" is in LUN 0 and data "123" also already is in Domain_ID 2 in LUN 2, but that the data "456" is not in Domain_ID 2 (this is not necessarily known in advance, although it could be), as FIG. 5A illustrates. Assume that, with a policy change requiring movement of data to the new domain id $D_2$ and the recalculation of the hash digests taking that new domain into account (e.g., per blocks 440-465 of FIG. 4, as noted herein), the new hash in domain $D_2$ for data 123 will be computed to be "bac" and the new hash in domain $D_2$ for data 456 will be computed to be yzx. For simplicity, the checks made in blocks 455-480 for each data set are described herein for one data set at a time.

For each data set, a check is made to determine if the newly calculated/created hash, for the new domain, is already in the new domain (block 470). In the example of FIGS. 5A and 51B, assume that the new hash of data "123" is computed (e.g., via the hash combine functions described above) for domain_id 2 and, per the check at block 470, the new hash of "bac" already exists in LUN 2 515C, as shown in FIG. 5A Because this hash of "bac" already exists in the different (new) domain domain_id 2, (e.g., at LBA 10 of LUN 2 515C), it means that the data "123" already is in the new domain $D_2$, so it does not necessarily have to be copied or moved to the new domain $D_2$, unless the specific policy requires that it be copied or moved.

Assume, in this example, that the new policy does require copying LUN 0 to domain_ID 2. Hence, the answer at block 470, for data "123," and the two domains shown in FIGS. 5A and 5B, is "Yes." Thus, as shown in FIG. 5B, although the data "123" is no longer associated with domain_id 0, the references to it are changed, as shown in FIG. 5B.

In particular, as shown in FIG. 5B, in reference count 519B, the reference count for hash "def" in domain $D_0$ is decremented (block 180) from a reference count of "1" (e.g., as shown in reference count 119A of FIG. 5A) to a reference count of "0," as shown in FIG. 119B of FIG. 5B. Similarly, because the hash for data "123" in domain $D_2$ is now being used twice, not once, the reference count for the hash of data "123" in domain $D_2$ is incremented (block 475) from 1 to 2.

In contrast, the processing runs differently for illustrative data set "456" of LUN 0. The hash of data set "456" for domain id $D_2$, in this example, is yzx, which, per FIG. 5A, is not already in domain $D_2$ (e.g., answer at block 470 is No). In this example, the policy change requires that the system copy the data "456" to the new domain $D_2$ location of LBA 30 of LUN 0 as copied to domain $D_2$ (block 485), which in some embodiments is a full copy (block 485).

Thus, by utilizing the above-described "smart" hash_combine ( ) and hash_uncombine ( ) functions, it is possible, in certain embodiments, to minimize the CPU utilization cost associated with making a real data copy by fully leveraging the single instance nature of the CAS data storage infrastructure.

It is envisioned that at least some embodiments described herein have applicability in providing agility in current and future content aware data services and can help provide cost effective software defined solutions to improve performance. In particular, by introducing the concept of a virtual storage domain (VSD), as described in connection with at least some embodiments described herein, diverse tenant and application needs can be bridged naturally with underlying unified hashing processes. This can enable a more flexible policy-based control without requiring changing the CAS storage infrastructure. In addition, at least some embodiments described herein provide tremendous flexibility to balance user needs of storage efficiency, unified performance, advanced data management, etc. For example, at least some of the disclosed embodiments and concepts relating to hashing metadata along with data to achieve data set isolation could be widely used in general CAS systems and/or object based storage systems.

The processes and operations described herein, including at least those shown and described in FIGS. 1A-5B, can be performed by a computer especially configured for the desired purpose or by a general-purpose computer especially configured for the desired purpose by another computer program stored in a computer readable storage medium or in memory.

Figure 6:
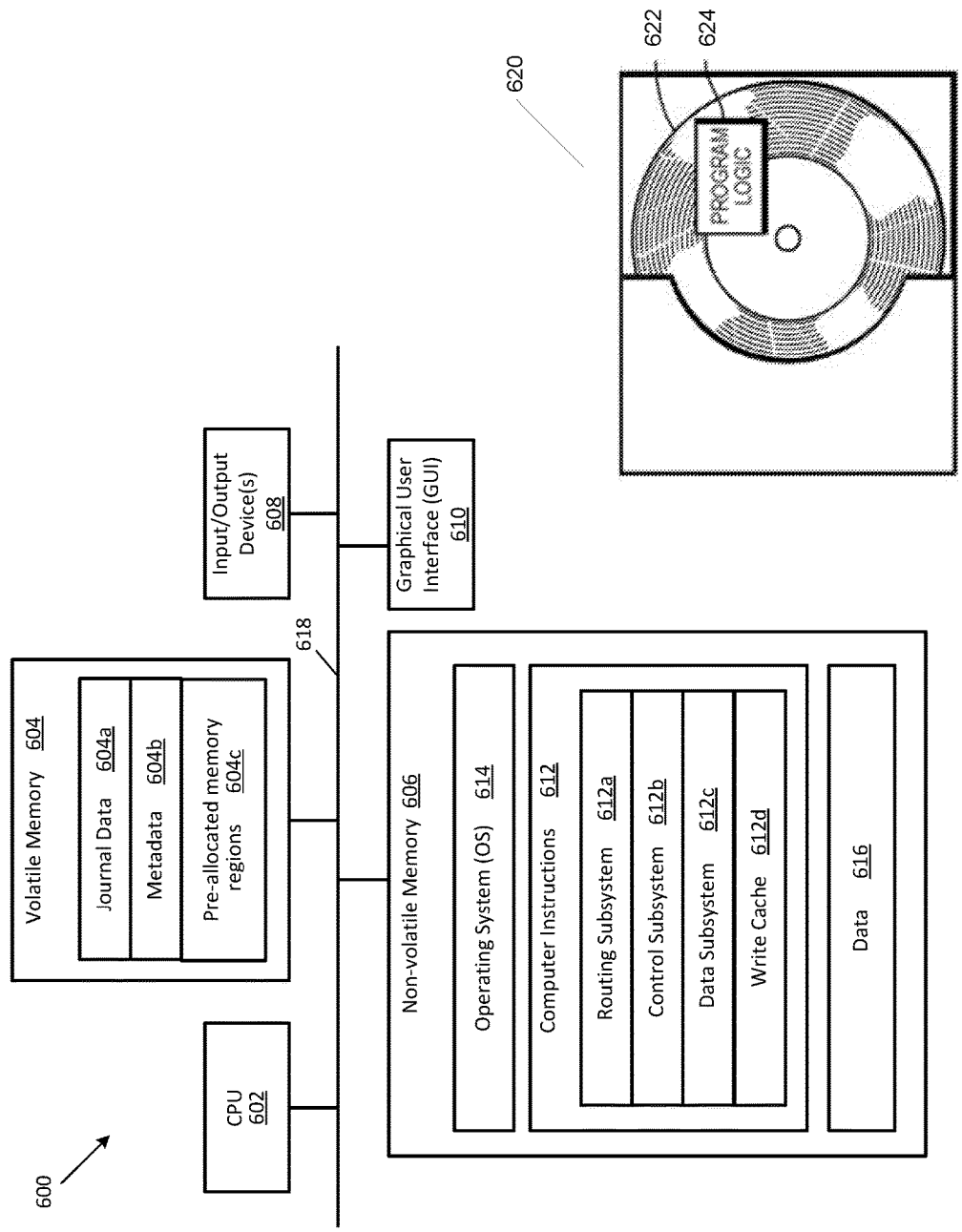
FIG. 6 is a block diagram of an example of a hardware device that may perform and/or implement at least a portion of the processes and functions depicted in the FIGS. 1A through 4.

FIG. 6 is a block diagram of an example of a hardware device that may perform and/or implement at least a portion of the processes and functions depicted in the FIGS. 1A through 5B. As shown in FIG. 6, computer 600 may include processor 602, volatile memory 604 (e.g., RAM), non-volatile memory 606 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 608 (e.g., a touchscreen, a display, and so forth) and input and/or output (I/O) device 620 (e.g., a mouse, a keyboard, etc.). In certain embodiments, the computer instructions 612 are executed by the processor/CPU 602 out of volatile memory 604 to perform at least a portion of the processes and functions shown in FIGS. 1A-4. Program code also may be applied to data entered using an input device or GUI 608 or received from I/O device 620.

The functions and processes of FIGS. 1A-5B above are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 6, which is useful for carrying out a method or implementing functions described with reference to embodiments shown in, for example, FIG. 1A-4. The functions and processes described herein are not limited to the specific embodiments described. For example, the functions and processes of FIG. 1A-5B are not limited to the specific components depicted in or processing order shown in any of FIGS. 1A-5B. Rather, any of the blocks of the processes may be re-ordered, combined, or removed, performed in parallel or in serial, as necessary, to achieve the results set forth herein.

Processor 602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A processor may perform the function, operation, or sequence of operations using digital values or using analog signals. In some embodiments, the processor can be embodied in one or more application specific integrated circuits (ASICs). In some embodiments, the processor may be embodied in one or more microprocessors with associated program memory. In some embodiments, the processor may be embodied in one or more discrete electronic circuits. The processor may be analog, digital, or mixed-signal. In some embodiments, the processor may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 6, the machine becomes an apparatus for practicing at least some of the embodiments described herein. When implemented on one or more general-purpose processors, the program code combines with such a processor to provide a unique apparatus that operates analogously to specific logic circuits. As such a general-purpose digital machine can be transformed into a special purpose digital machine.

FIG. 6 shows program logic embodied on a computer-readable medium 622 as shown, and wherein the logic is encoded in computer-executable code configured for carrying out the process of providing virtual storage domain for an illustrative content addressable system and thereby forming a computer program product. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, the storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method comprising:
   configuring a storage system comprising a processor in operable communication with a storage device, the storage device responsive to input/output (I/O) requests to the storage device from one or more entities in operable communication with the storage system;
   configuring a plurality of virtual storage domains (VSD) in operable communication with the storage system, the plurality of VSDs each associated with respective one or more policies, wherein each respective VSD comprises a respective unique VSD domain identifier (ID);
   tagging a first unique VSD domain ID to a request to the storage system when a first entity writes a first data set to the storage system, wherein the tagging is based at least in part on a first policy applicable to the first data set, wherein the first unique VSD domain ID is associated with the first policy;
   calculating a first hash digest of the first data set based at least in part on content of the first data set;
   combining the first hash digest and the first unique VSD domain ID into a second hash digest that is associated with the first data set;
   storing the first data set in a first VSD associated with the first unique VSD domain ID;
   associating the first data set with a second unique VSD domain when the first policy is changed to a second policy, wherein the second policy is associated with a second unique VSD domain ID;
   calculating a third hash digest of the first data set, the third hash digest based at least in part on the content of the first data set and on the second unique VSD domain ID;
   determining, whether the third hash digest exists in the second VSD;

based on a positive determination, incrementing a first reference count of the third hash digest associated with the second VSD domain and decrementing a second reference count of the second hash digest associated with the first VSD domain; and based on a negative determination, copying the first data set to the second VSD.

2. The method of claim 1, wherein the combining of the first hash digest and the first unique VSD domain ID is configured to preserve a randomness of the first hash digest.

3. The method of claim 1, wherein the first unique domain ID comprises an input to the calculation of the second hash digest.

4. The method of claim 1, wherein combining the first hash digest and the first unique VSD domain ID into the second hash digest is accomplished using a hash_combine( ) function.

5. The method of claim 4, wherein the hash_combine( ) function is configured to combine using the first unique VSD domain ID as a seed and the first hash digest as a value.

6. The method of claim 1, wherein calculating the third hash digest further comprises swapping the out first unique VSD domain ID from the second hash digest and replacing the second hash digest with the second unique VSD domain ID.

7. The method of claim 6, further comprising using a hash_uncombine( ) function to swap out the first unique VSD domain ID and to place the second hash digest with the second unique VSD domain ID.

8. A system, comprising:
a processor; and
a non-volatile memory in operable communication with the processor and storing computer program code that when executed on the processor causes the processor to execute a process operable to perform the operations of:
configuring a storage system comprising a processor in operable communication with a storage device, the storage device responsive to input/output (I/O) requests to the storage device from one or more entities in operable communication with the storage system;
configuring a plurality of virtual storage domains (VSD) in operable communication with the storage system, the plurality of VSDs each associated with respective one or more policies, wherein each respective VSD comprises a respective unique VSD domain identifier (ID);
tagging a first unique VSD domain ID to a request to the storage system when a first entity writes a first data set to the storage system, wherein the tagging is based at least in part on a first policy applicable to the first data set, wherein the first unique VSD domain ID is associated with the first policy;
calculating a first hash digest of the first data set based at least in part on content of the first data set;
combining the first hash digest and the first unique VSD domain ID into a second hash that is associated with the first data set;
storing the first data set in a first VSD associated with the first unique VSD domain_ID;
associating the first data set with a second unique VSD domain when the first policy is changed to a second policy, wherein the second policy is associated with a second unique VSD domain ID;
calculating a third hash digest of the first data set, the third hash digest based at least in part on the content of the first data set and on the second unique VSD domain ID;
determining, whether the third hash digest exists in the second VSD;
based on a positive determination, incrementing a first reference count of the third hash digest associated with the second VSD domain and decrementing a second reference count of the second hash digest associated with the first VSD domain; and
based on a negative determination, copying the first data set to the second VSD.

9. The system of claim 8, wherein the combining of the first hash digest and the first unique VSD domain ID is configured to preserve a randomness of the first hash digest.

10. The system of claim 8, wherein the first unique domain ID comprises an input to the calculation of the second hash digest.

11. The system of claim 8, wherein combining the first hash digest and the first unique VSD domain ID into the second hash digest is accomplished using a hash_combine( ) function.

12. The system of claim 11, wherein the hash_combine( ) function is configured to combine using the first unique VSD domain ID as a seed and the first hash digest as a value.

13. The system of claim 8, wherein calculating the third hash digest further comprises swapping the out first unique VSD domain ID from the second hash digest and replacing the second hash digest with the second unique VSD domain ID.

14. The system of claim 8, further comprising computer program code that when executed on the processor causes the processor to execute a process operable to perform the operations of using a hash_uncombine( ) function to swap out the first unique VSD domain ID and to place the second hash digest with the second unique VSD domain ID.

15. A computer program product including a non-transitory computer readable storage medium having computer program code encoded thereon that when executed on a processor of a computer causes the computer to operate a storage system, the computer program product comprising:
computer program code for configuring a storage system comprising a processor in operable communication with a storage device, the storage device responsive to input/output (I/O) requests to the storage device from one or more entities in operable communication with the storage system;
computer program code for configuring a plurality of virtual storage domains (VSD) in operable communication with the storage system, the plurality of VSDs each associated with respective one or more policies, wherein each respective VSD comprises a respective unique VSD domain identifier (ID);
computer program code for tagging a first unique VSD domain ID to a request to the storage system when a first entity writes a first data set to the storage system, wherein the tagging is based at least in part on a first policy applicable to the first data set, wherein the first unique VSD domain ID is associated with the first policy;
computer program code for calculating a first hash digest of the first data set based at least in part on content of the first data set;

computer program code for combining the first hash digest and the first unique VSD domain ID into a second hash digest that is associated with the first data set;

computer program code for storing the first data set in a first VSD associated with the first unique VSD domain ID;

computer program code for associating the first data set with a second unique VSD domain, when the first policy is changed to a second policy, wherein the second policy is associated with a second unique VSD domain ID;

computer program code for calculating a third hash digest of the first data set, the third hash digest based at least in part on the content of the first data set and on the second unique VSD domain ID;

computer program code for determining, whether the third hash digest exists in the second VSD;

computer program code for incrementing a first reference count of the third hash digest associated with the second VSD domain and decrementing a second reference count of the second hash digest associated with the first VSD domain, based on a positive determination; and computer program code for copying the first data set to the second VSD, based on a negative determination.

16. The computer program product of claim 15, further comprising computer program code configured for preserving a randomness of the first hash digest when the first hash digest is combined with the first unique VSD domain ID.

17. The computer program product of claim 15, wherein the first unique domain ID comprises an input to the calculation of the second hash digest.

18. The computer program product of claim 15, further comprising computer program code for combining the first hash digest and the first unique VSD domain ID into the second hash digest, using a hash_combine( ) function.

19. The computer program product of claim 18 further comprising computer program code configured to enable the hash_combine( ) function to combine using the first unique VSD domain ID as a seed and the first hash digest as a value.

20. The computer program product of claim 15, further comprising computer program code for calculating the third has digest that comprises swapping the out first unique VSD domain ID from the second hash digest and replacing the second hash digest with the second unique VSD domain ID.

* * * * *